United States Patent [19]

Katsuyama et al.

[11] Patent Number: 4,731,775
[45] Date of Patent: Mar. 15, 1988

[54] INFORMATION RECORDING REGENERATING APPARATUS

[75] Inventors: Toshihiko Katsuyama; Takao Aihara, both of Tokyo, Japan

[73] Assignee: Olympus Optical Company Limited, Tokyo, Japan

[21] Appl. No.: 803,722

[22] Filed: Dec. 2, 1985

[30] Foreign Application Priority Data

| Dec. 3, 1984 | [JP] | Japan | 59-255373 |
| Dec. 3, 1984 | [JP] | Japan | 59-255372 |
| Dec. 6, 1984 | [JP] | Japan | 59-258287 |
| Mar. 9, 1985 | [JP] | Japan | 60-47089 |
| Mar. 11, 1985 | [JP] | Japan | 60-47662 |

[51] Int. Cl.$^4$ .............................................. G11B 17/04
[52] U.S. Cl. .................... 369/77.2; 369/75.2
[58] Field of Search ..................... 369/75.2, 77.1, 77.2

[56] References Cited

U.S. PATENT DOCUMENTS

| 4,539,671 | 9/1985 | Higashihara | 369/75.1 |
| 4,561,085 | 12/1985 | Funabashi | 369/77.1 |
| 4,564,930 | 1/1986 | Funabashi et al. | 369/75.2 |
| 4,607,361 | 8/1986 | Schuitmaker et al. | 369/75.2 |

FOREIGN PATENT DOCUMENTS

| 56-58167 | 5/1981 | Japan | 369/75.2 |
| 161187 | 9/1983 | Japan | 369/75.2 |

Primary Examiner—Steven L. Stephan
Attorney, Agent, or Firm—Bruce L. Adams; Van C. Wilks

[57] ABSTRACT

An information recording reproducing apparatus adapted to receive a cartridge therein which contains a disc is provided. The cartridge is loaded in the apparatus on a cartridge transfer body which moves horizontally and then vertically. A disc clamp arm is pivotably supported on the cartridge transfer body, and a clamp head disposed at one end of the clamp arm clamps the disc when the cartridge transfer body descends vertically to be positioned on the turn table.

14 Claims, 17 Drawing Figures

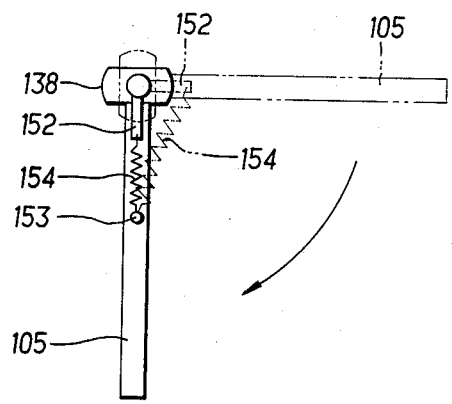
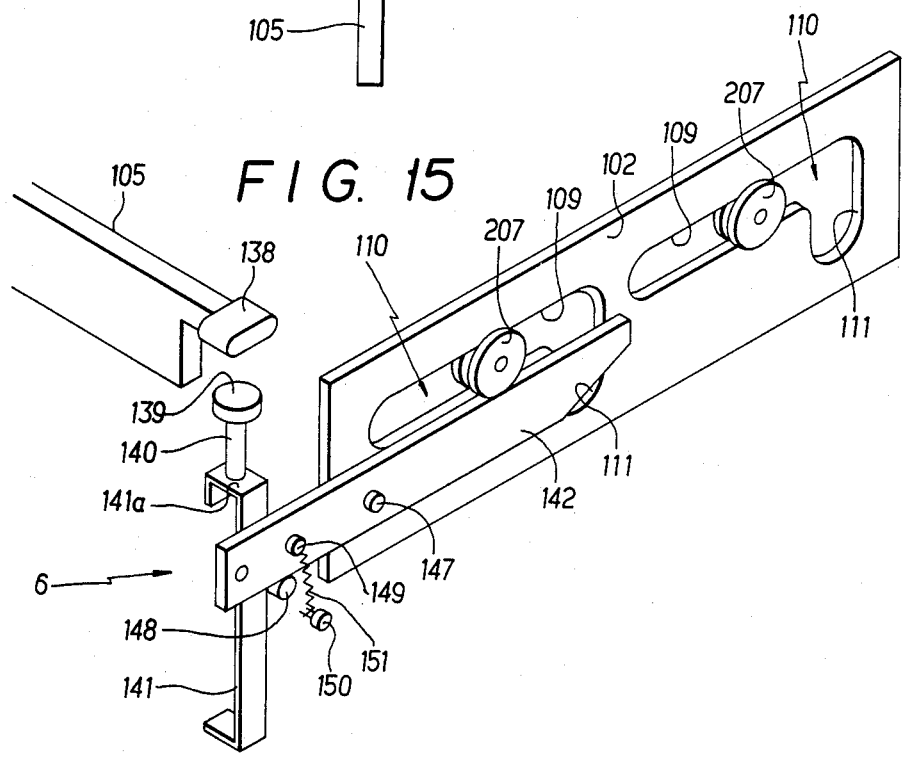

INFORMATION RECORDING REGENERATING APPARATUS

BACKGROUND OF THE INVENTION

Technical Field

The present invention relates to an information recording and reproducing apparatus having an automatic loading mechanism for a cartridge which contains a disc-like recording medium e.g. photo disc or photo magnetic disc, and more particularly to a cartridge transfer and disc clamp mechanism of the information recording reproducing apparatus.

In a conventional information recording reproducing apparatus adapted to use a cartridge which contains an information recording medium e.g. a disc a and which is inserted into the apparatus is supported by a cartridge transfer body which supports and displaces the cartridge, and is transferred to the position of a turntable. At the end of the displacement of the cartridge transfer body, a clamp mechanism which clamps the disc in the cartridge is actuated.

Timing to move the cartridge transfer body to the turn table and timing to clamp the disc in the cartridge is correlated. Timing to position the cartridge transfer body on the turn table and timing to clamp the disc by the clamp mechanism are synchronized.

However transfer mechanism of the cartridge transfer body and actuation mechanism of the clamp mechanism are essentially independent with each other so that a complex mechanism is necessary to synchronize the timing.

The object of the present invention is to provide an information recording reproducing apparatus having a cartridge transfer and disc clamp mechanism which is a simple construction without complex synchronous operating mechanism.

SUMMARY OF THE INVENTION

According to the feature of the present invention, the information recording reproducing apparatus of the type mentioned includes a cartridge transfer body supporting the cartride, a cartridge transfer body drive mechanism to transfer the cartridge transfer body and a clamp mechanism cooperating with the displacement of the cartridge transfer body and pivotably supported to clamp the disc, and the clamp mechanism comprises a clamp support aim pivotably supported on the cartridge transfer body and rockable relative to the cartridge, a clamp head supported at a free end of the clamp support arm and adapted to be engageable with the center portion of the disc, and a clamp actuation portion at the other end of the clamp support arm and engageable with guide means on the apparatus frame.

BRIEF DESCRIPTION OF THE DRAWING

The information recording reproducing apparatus will be described in detail referring to preferred embodiment, by way of example, and accompanying drawing, in which:

FIG. 14 is an illustration of the front cover, FIG. 15 is a perspective view showing another embodiment of the lock apparatus.

DETAILED DESCRIPTION OF PREFERRED EMBODIMENTS

Figure 1:
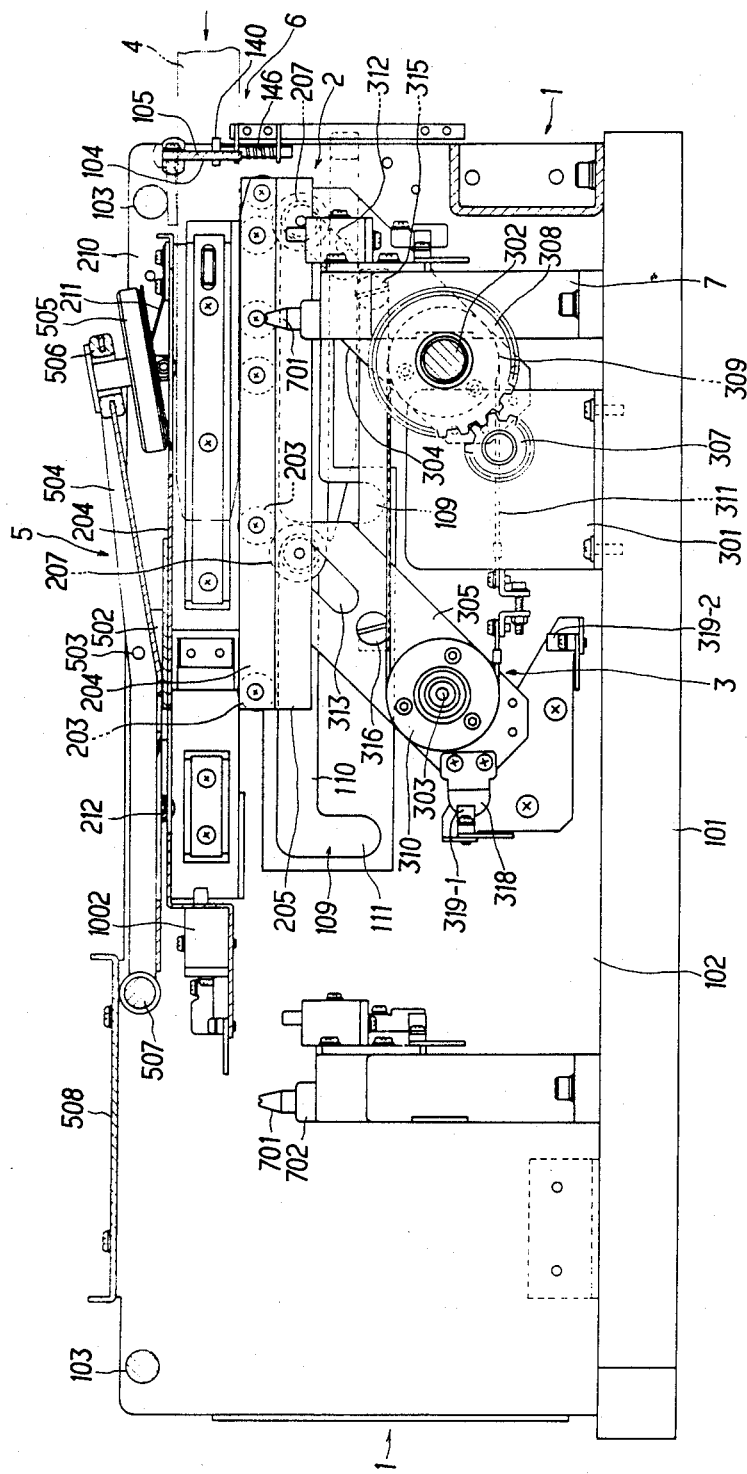
FIGS. 1-3 are longitudinal cross sectional views showing operation of the information recording reproducing apparatus, according to the present invention.

Referring to FIGS. 1-6, the information recording and reproducing apparatus according to the present invention comprises a body frame 1, a cartridge transfer body 2 which carries a cartridge 4, a transfer body drive mechanism 3 which drives the cartridge transfer body 2, a disc clamp mechanism 5 which clamps the disc in the cartridge 4 and a front cover lock apparatus 6.

Figure 4:
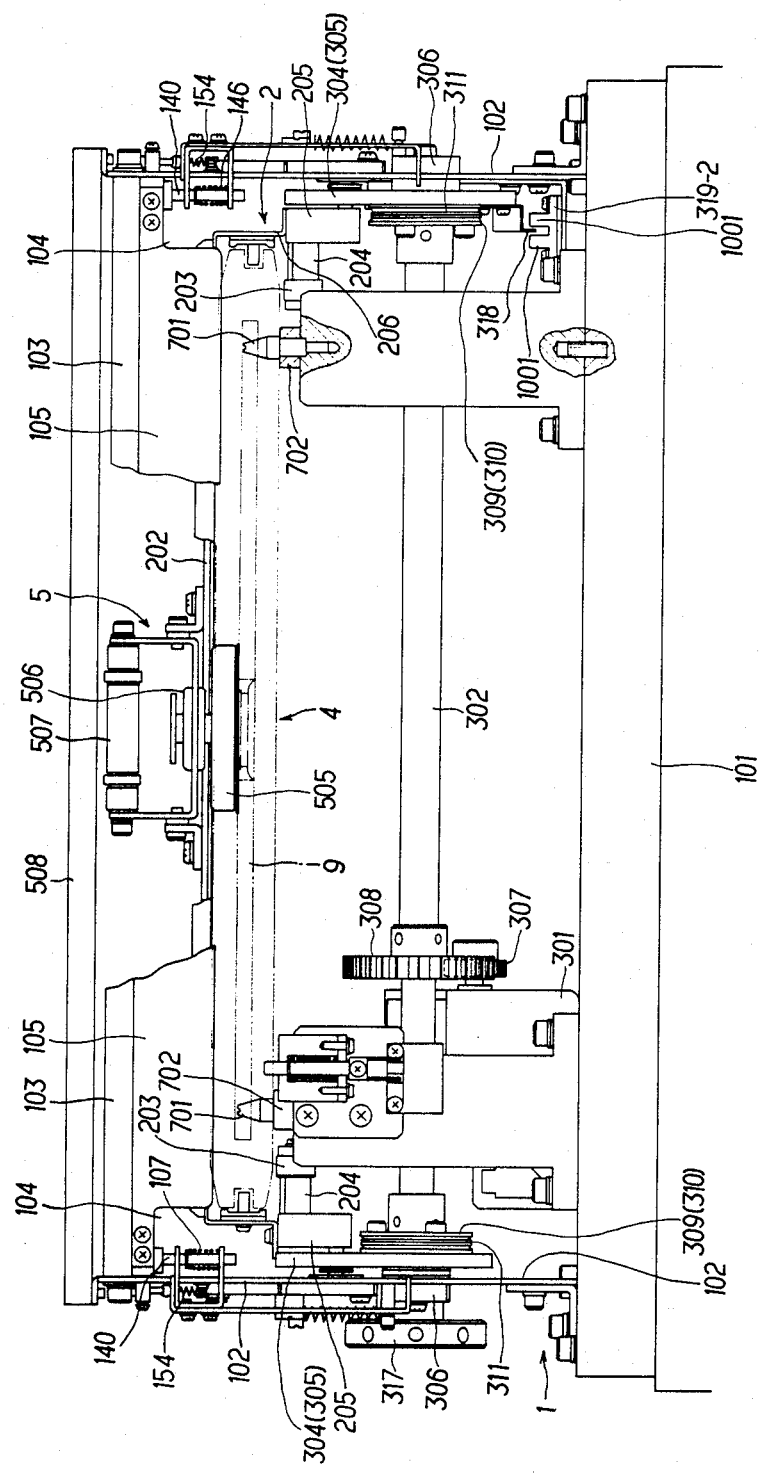
FIGS. 4 and 5 are lateral sectional views and plan view of the apparatus shown in FIGS. 1-3.

The body frame 1 comprises a base 101 on which side plates 102 and 102 are attached by screws, and a plurality of reinforce members 103 connects the side plates 102 with each other. Front end, i.e., right end in FIG. 1, of the frame 1 has an insert opening 104 which receives a cartridge 4. The insert inlet opening 104 has a cover 105 which is normally closed by urging force of a spring 154 as shown in FIG. 4 and is locked by a pin 140 which is urged upwards by a spring 146. The lock mechanism 6 will be described in more detail afterwards. The side plate 102 has transfer guide grooves 109.

Figure 7:
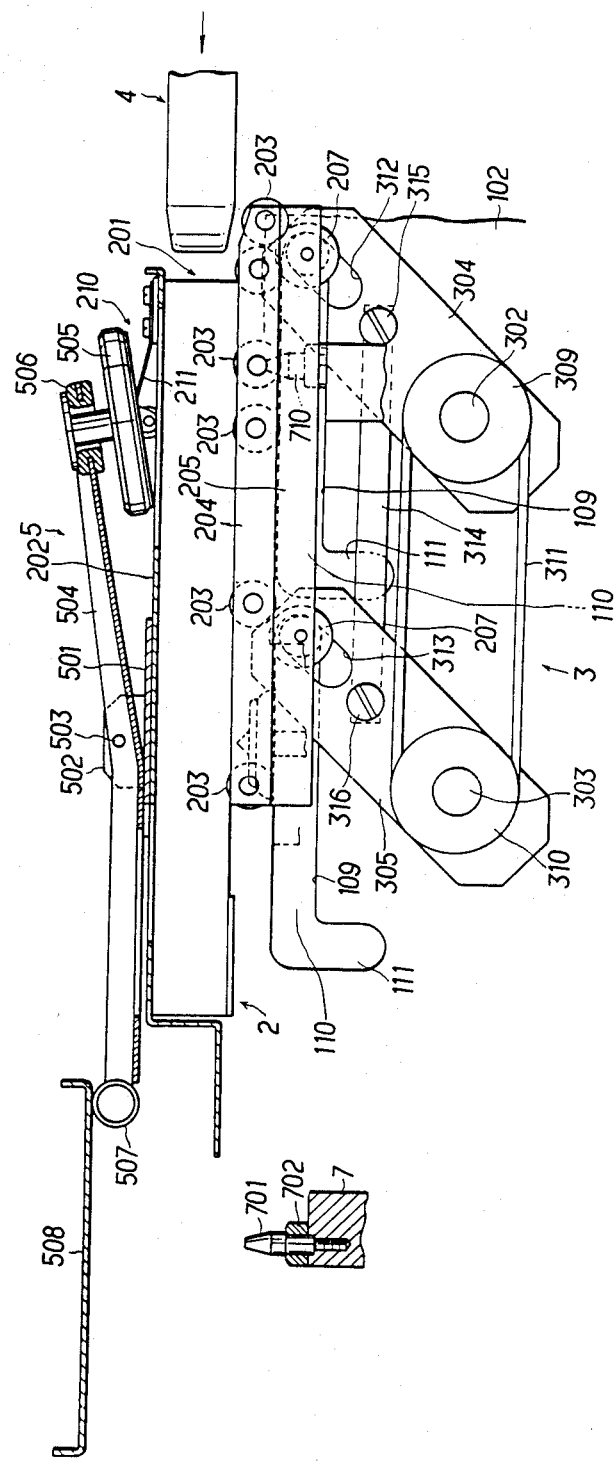
Figure 9:
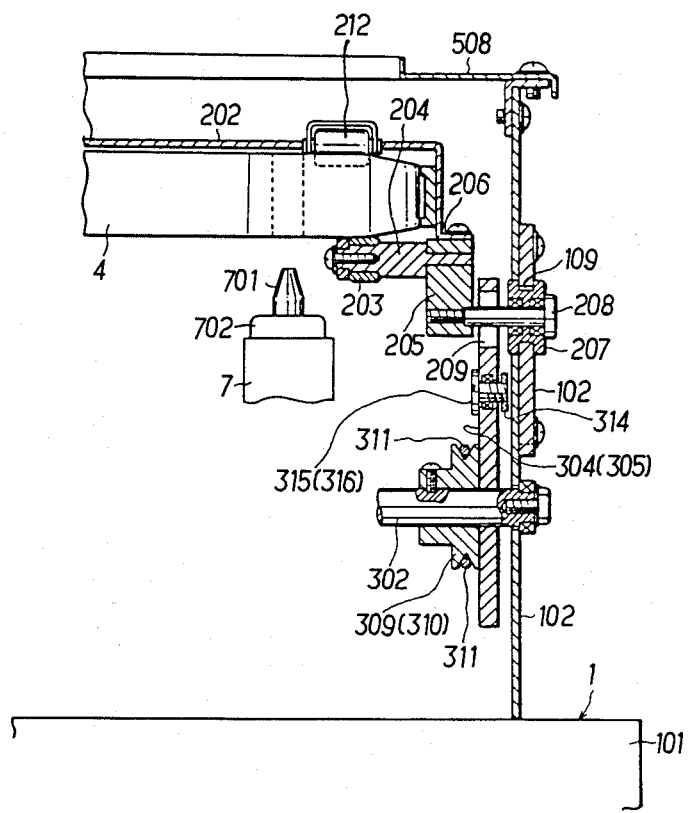
FIG. 9 is a partial sectional view of the mechanism shown in FIGS. 7 and 8.

The cartridge transfer body 2 comprises a frame like body in the frame 1 and supports a cartridge 4 inserted into the insert opening 104 and transfers the cartridge 4 to a predetermined position. As shwon in FIGS. 7 and 9, an upper plate 202 of the cartridge transfer body 2 mounts the disc clamp mechanism 5 and a lower side of the body 2 is supported by a transfer body support frame 205. The transfer body support frame 205 supports a roller frame 204 having therein a plurality of cartridge inserting guide rollers 203. As shown in FIG. 9, the support frame 205 is integrally secured by screws with an angle-like leg 206 which is formed by bending the upper plate 202. The cartridge is supported by the rollers 203 disposed on the roller frame 204. Further, the transfer support body 205 has transfer guide rollers 207. The transfer guide rollers 207 is supported around a cooperating shaft 208 on the cartridge support body 2, and engages with transfer guide grooves 109 formed in the side plate 102. The transfer guide groove 109 has a horizontal transfer portion 110 and a vertically downward transfer portion 111. The cooperating shafts 208 which support the transfer guide rollers 207 engage with link levers 304 and 305 of the transfer drive mechanism 3, as will be described later.

A cartridge retainer 210 is mounted on the upper plate 202 of the cartridge transfer body 2 and engages with a positioning and retaining recess 1010 provided on the cartridge by means of a roller 212 at a free end of an elastic arm 211.

The transfer body drive mechanism 3 comprises a drive motor 301, a drive shaft 302 which is rotated by the drive motor 301, and a link lever 304 which is secured with the shaft 302.

The drive shaft 302 is rotatably supported by bearings 306 between the two side plates 102. The drive motor 301 and the drive shaft 302 are connected through ruduction gears 307 and 308. A pulley 309 is secured to the drive shaft 302. A drive shaft 303 has a pully 310, and the pulleys 309 and 310 are connected through a wire 311 so that the shaft 302 and 303 rotate synchronously.

Another link lever 305 is secured with the shaft 303. The link levers 304 and 305 are formed with slots 312 and 313 at the free end portions thereof respectively. The slots 312 and 313 engage with the cooperating shafts 208 of the cartridge transfer rollers 207. This connection or linkage transmits the drive force of the motor to the cartridge transfer body 2.

The drive mechanism 3 is comprised of one pair of the link levers 304, 305 at left and right sides to transfer the cartridge. However, to transfer a wide cartridge transfer body according to the present invention, a plurality of pairs of link levers 304 and 305 may preferably be provided to stabilize the cartridge transfer body, and to uniformly distribute drive force.

To synchronize the parallel-arranged link levers 304 and 305, to eliminate vertical imbalance between the link levels, and to eliminate inclinations of the transfer body, a plurality of pairs of the link levers are connected with each other by connecting rods 314 through pivotable connecting pins 315 and 316.

On outer projected portion of the drive shaft 302 fits a manually operable knob 317. By turning the manual knob 317, the drive shaft 302 can be rotated manually. The lower ends of the link levers 304 and 305 mount a pair of switch elements 318. The switch elements 318 are adapted to be received by photoelectric switch bodys 319-1 and 319-2 respectively. As shown in FIG. 4, light ray from a light emitter 1000 of the photoelectric switch body to a light receiver 1001 is disturbed or interrupted by the switch element 318 to perform switch function. Thus, cartridge transfer operation and switch is actuated.

The disc clamp mechanism 5 is pivotally supported by a pivot shaft 503 which is mounted on a clamp support plate 502 of a clamp table 501 which is secured to an upper plate 202 of the cartridge transfer body 2. A clamp support arm 504 of the disc clamp mechanism 5 supports at the free end thereof a clamp holder 506 which slidably supports a clamp head 505. At the other end of the clamp support arm 504, a cylindrical clamp actuation member 507 is mounted. The clamp actuation member 507 slidably engages with the lower surface of a clamp guide plate 508 which is secured to the upper portion of the main body frame 1.

Figure 2:
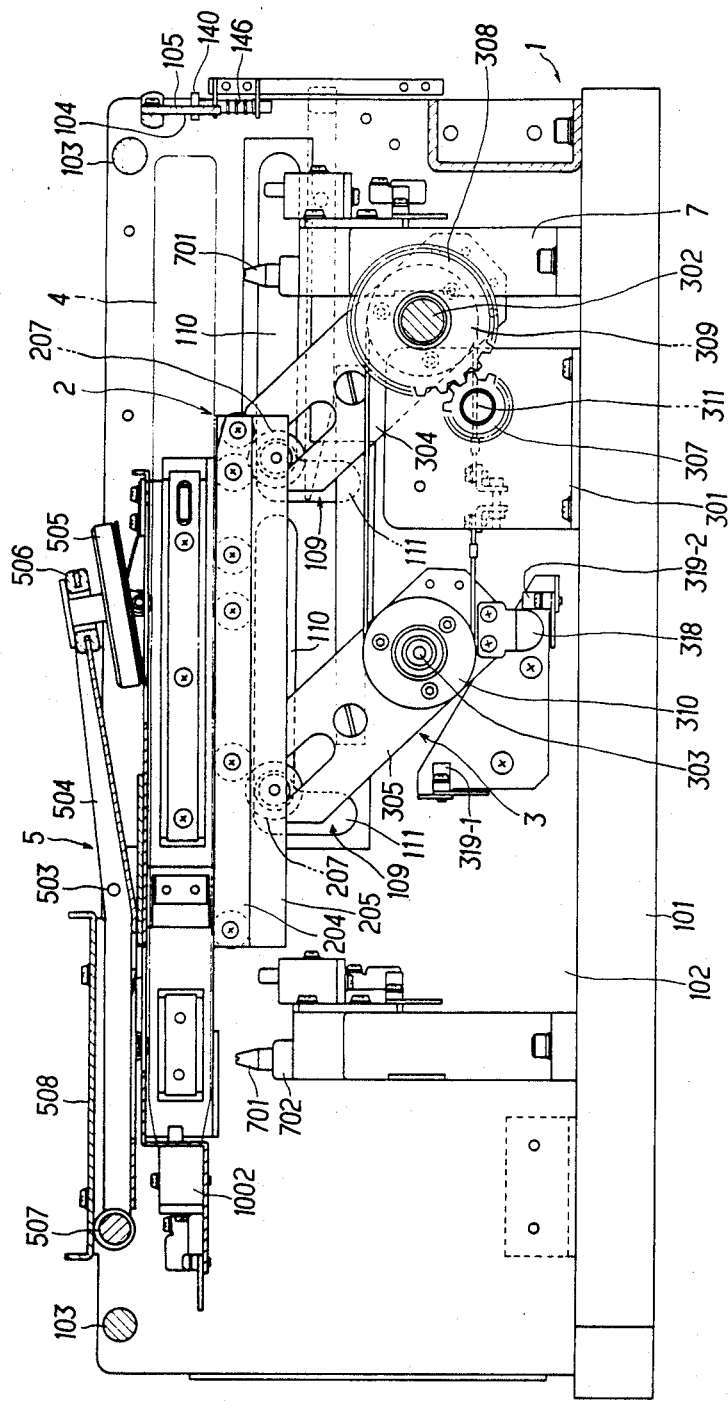

The clamp guide plate 508 is designed to retain the clamp actuation member 507 of the disc clamp mechanism 5 to maintain the clamp support arm 504 in a counterclockwisely rotated position and to hold the clamp head 505 in an inoperative position when the cartridge transfer body 2 moves from the cartridge insert ready position as shown in FIG. 1 to the end of the horizontal transfer portion 110 of the transfer guide groove 109 as shown in FIG. 2.

In place of the clamp guide plate, elongated opening means may be formed to guide the clamp operating end 507.

Figure 8:
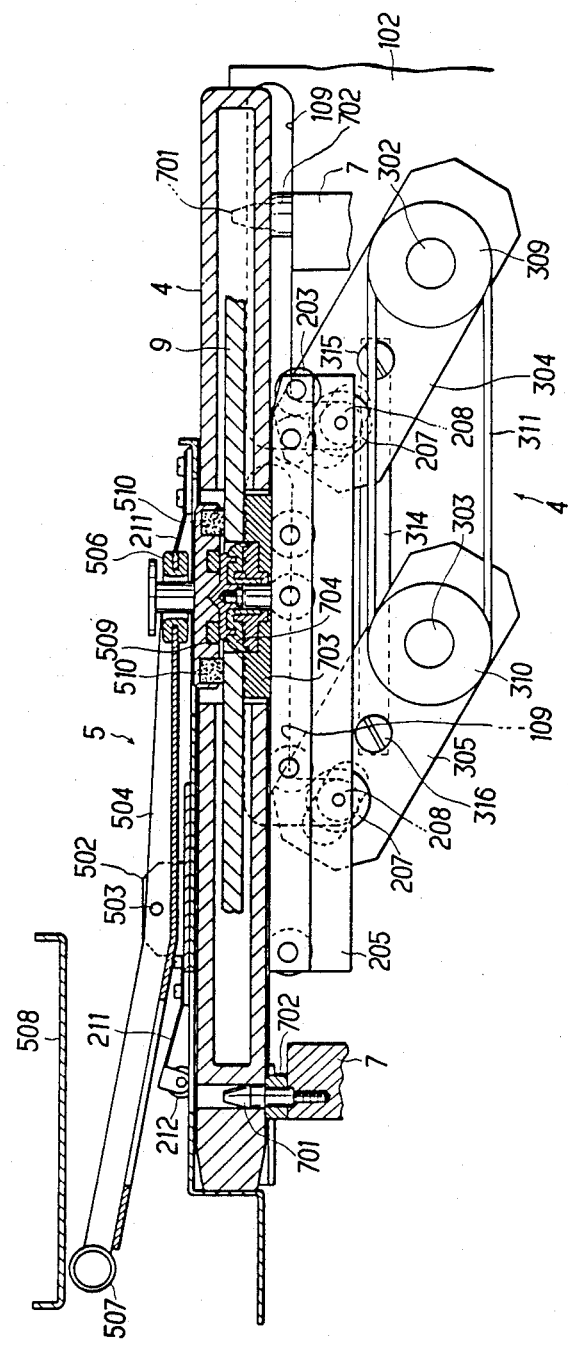
Figure 10:
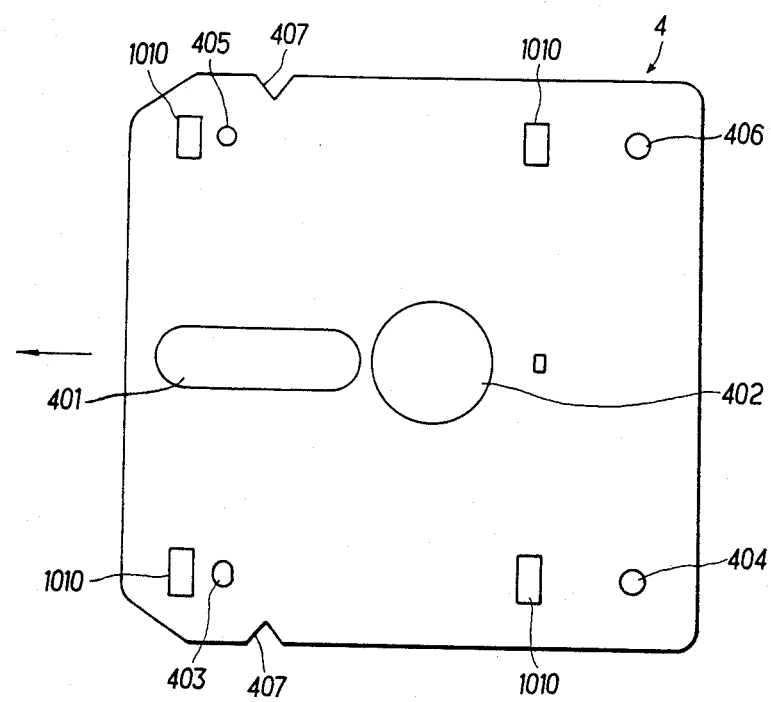
FIG. 10 is a bottom view of the cartridge.

A cartridge positioning pins 701 are secured to the stationary base of the frame 1, corresponding to positioning openings 403, 404, 405 and 406 of the cartridge 4 as shown in FIG. 10. Each pin 701 has a vertical positioning member 702. The vertical positioning member 702 may be a shoulder portion formed integrally with the positioning pin 701. The horizontal and vertical positions of the cartridge 4 are determined by the pins 701 and 702. The vertical positon of the vertical positioning member 702 is determined such that the vertical height of the cartridge placing surface of the member 702 is lower than the disc-like recording medium placing surface of a turn table 703. A distance difference is sum of clearance between the disc 9 and the cartridge 4 and the thickness of the base plate of the cartridge, as shown in FIG. 8. Thus, the disc 9 can be rotated by the turntable 703 without interference or contact with the cartridge 4.

Figure 5:
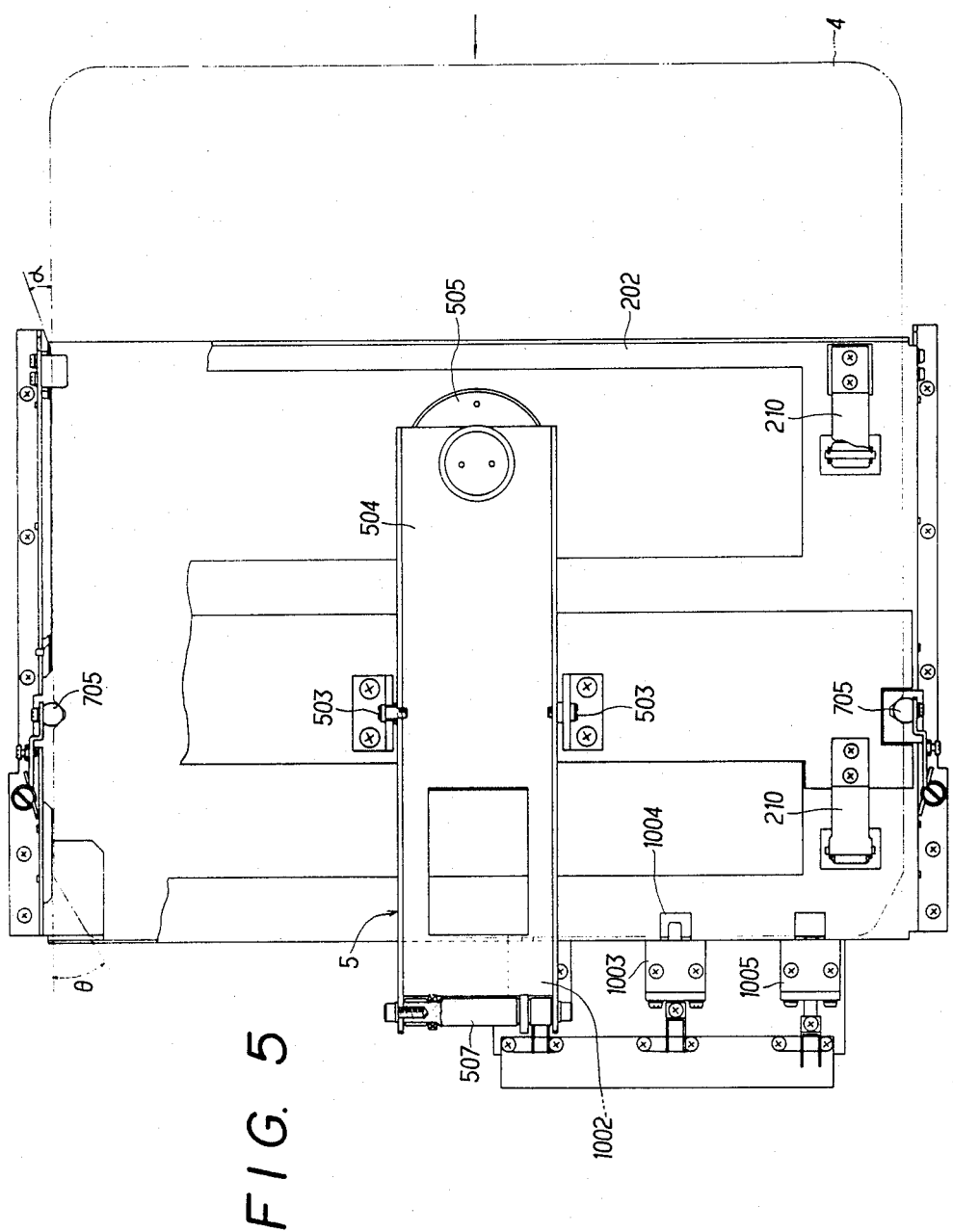
Figure 6:
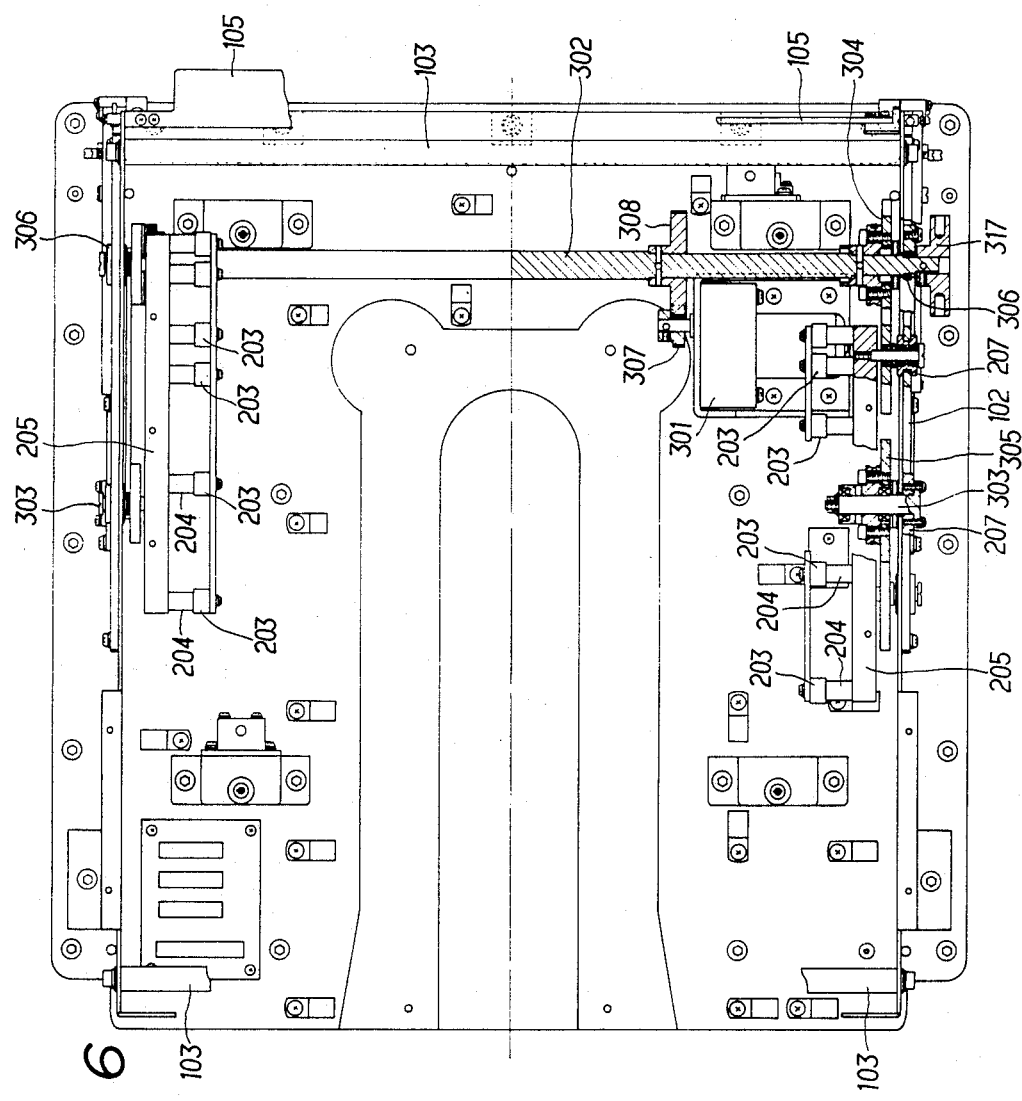
FIG. 6 is a plan view in section of the apparatus shown in FIG. 5, FIGS. 7 and 8 are partial longitudinal sectional views of the main protion of a cartridge transfer mechanism of the apparatus shown in FIGS. 1-6.

Referring to FIG. 5, a microswitch 1002 is ON when the cartridge is inserted in the cartridge transfer body. A micro switch 1003 is a switch to detect A surface or B surface of the cartridge. In FIG. 5, the switch 1003 is made OFF by a recess 1004 of the cartridge to indicate that the surface is A surface. When the cartridge is inserted oppositely the flat surface of the cartridge engages with the switch 1003 to actuate the switch ON to show the surface is B surface.

A micro-switch 1005 detects whether the inserted cartridge is recordable or not by presence or absence of a recess. The recess may be formed by detaching an easily removable tongue, or by a displacable tongue through guide groove, or by a window.

The cartridge 4 is shown in FIG. 10 and comprises a recording and reproducing head insert opening 401, a disc drive turn table insert opening 402, positioning through holes 403–406 at four corners of the base plate of the cartridge, and recesses 407 on both sides of the cartridge. The recesser 407 is utilized for positioning of the cartridge relative to the cartridge transfer body when the cartridge is transfered. A front end of the cartridge is tapered at a predetermined angle $\theta$ as shown in FIG. 5. Thus, insert of the cartridge into the cartridge transfer body is easy. Inlet angle of the transfer body $\alpha$ generally conforms to cartridge angle $\theta$. On both surfaces of the cartridge 4, positioning and retaining recesses 1010 are formed.

Figure 11:
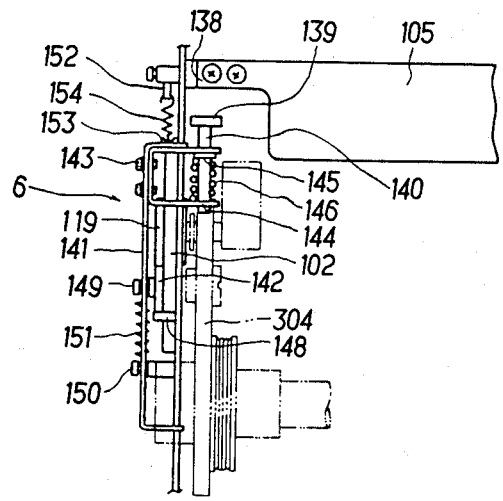
FIG. 11 is a portion of FIG. 4, FIGS. 12 and 13 are side views illustrating operation of a front cover lock apparatus.
Figure 12:
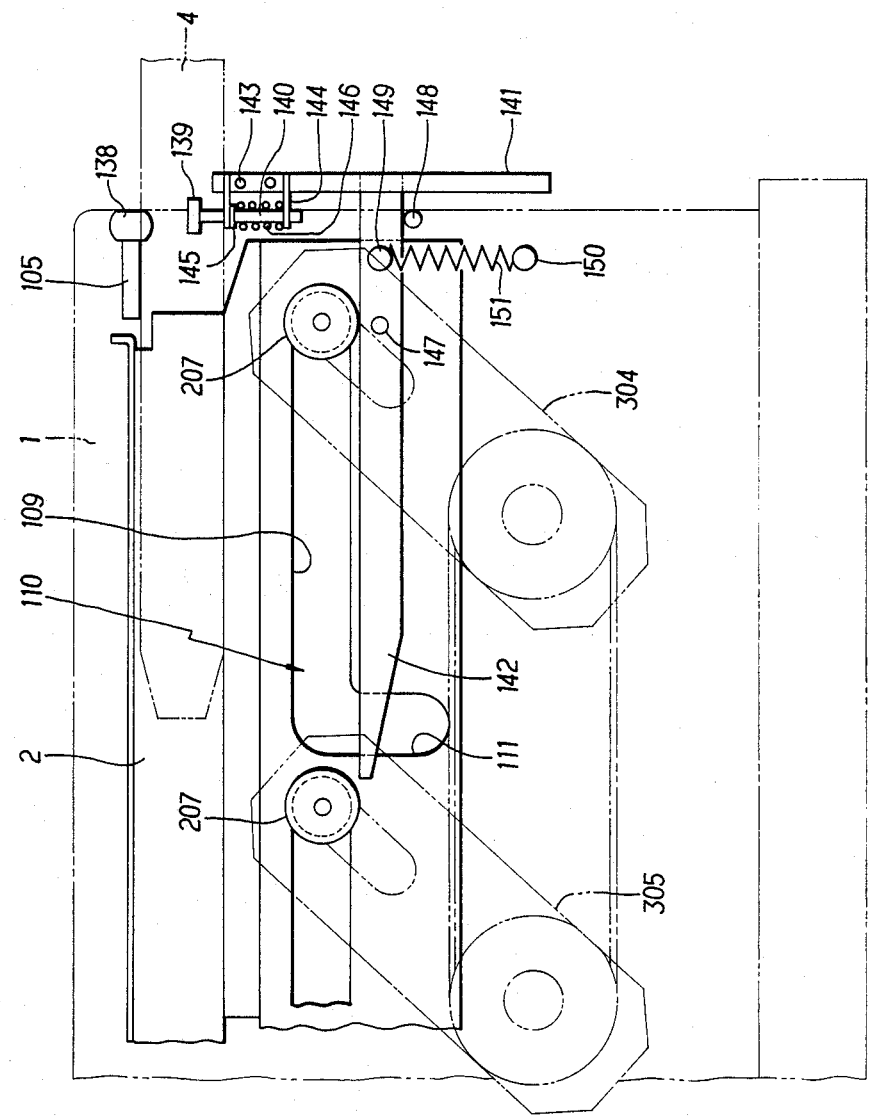
Figure 13:
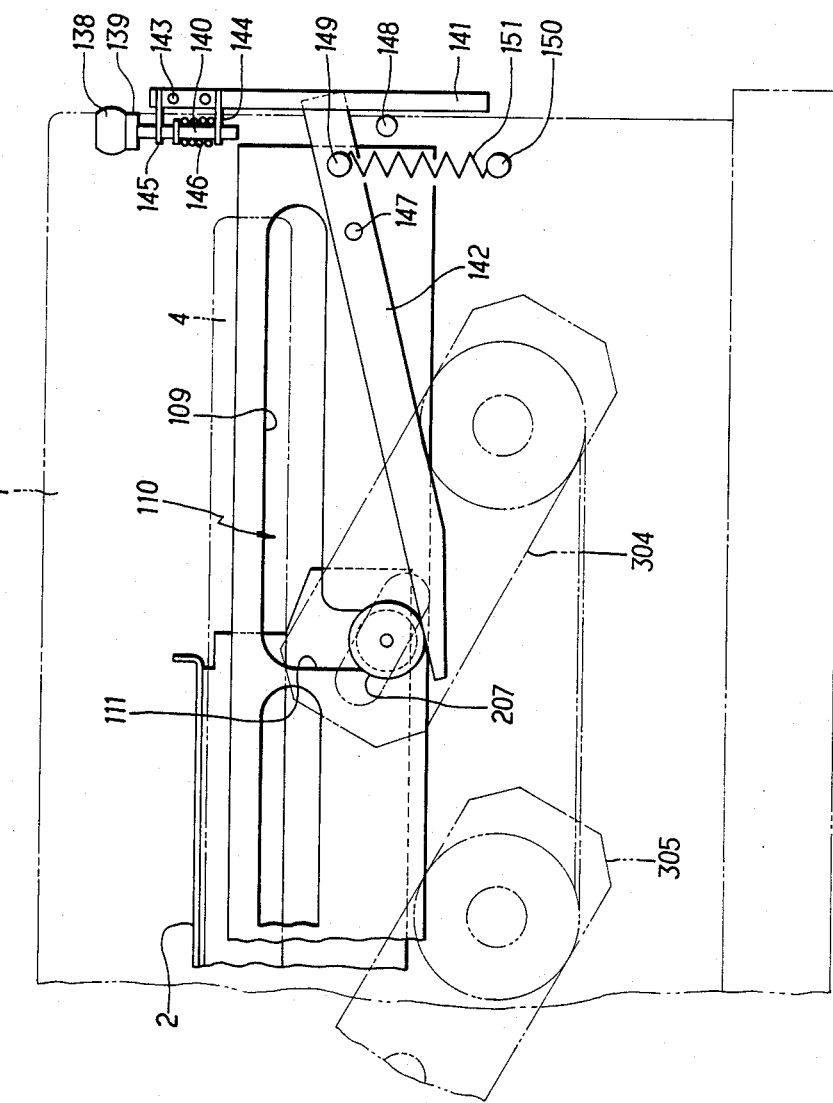

The front cover lock apparatus 6 locks the front cover 105 when the cartridge 4 is inserted into the main body to prevent the front cover 105 from opening accidentally. As shwon in FIGS. 11-13, the lock apparatus 6 comprises a lock engage portion 138 formed on the front cover 105, a lock member 140 having a lock engage portion 139 which cooperates with the cover side lock engage portion 138 to limit rotation of the front cover 105, a support member 141 which supports the lock member 140, and a lock actuation lever 142 which vertically moves the lock member 140.

The lock engage portion 138 of the front cover 105 is formed on each side of the rotation support portion of the front cover 105 so that the front cover 105 is stably locked by both sides of lock apparatus 6. The lower surface of the lock engage portion 138, i.e., lower surface when the cover 105 is closed, is formed as flat surface. The upper surface of the lock engage portion 139 of the lock member 140 is also flat, and when the lock engage portion 138 and 139 contact with each other, the movement of the cover 105 is limited.

The lock member 140 is vertically movably supportd by a bracket 144 which is secured with the support member 141 by screws 143. The lock member 140 is normally urged vertically upwards by a compression spring 146 which is engaged between the bracket 144 and a spring engage portion 145 which is secured with the lock member 140.

The lock actuation lever 142 is arranged horizontally along the guide groove 109 which guides horizontal transfer of the cartridge 4. The lever 142 is pivotably supported on the apparatus body by a pivot shaft 147. One side of the lock actuation lever 142 is connected with the support member 141 for the lock member 140 so that the lock member 140 moves vertically by rotation or rocking movement of the lock actuation lever 142. The lock actuation lever 142 maintains horizontal positon by a stopper pin 148 which is secured to the apparatus frome, and also by tension spring 158 which engages between a lever side retaining pin 149 and an apparatus frame side retaining pin 50 to pull the right side arm of the lever 142 downwards. The upper side surface of the lock actuation lver 142 is adapted to contact with the guide roller 207 which rolls along the guide groove 109 and 111. When the guide roller 207 of the cartridge transfer body 2 descends vetically along the vertical transfer guide groove 111, the lock actuation lever 142 rotates counterclockwise about the pivot shaft 147 by the guide roller 207. The left end of the lock actuation lever 142 must be determined to be engaged by the vertically descending guide roller 207.

As shown in FIG. 14, bearing portion of the front cover 105 projects a spring retaining pin 152 to the same direction of the plate of the cover 105. Between the spring retaining pin 152 and a spring retaining pin 153 which projects from the apparatus frame, a tension coil spring 154 is retained to urge the front cover 105 to normally closed positon.

The operation of the information recording and regenerating apparatus, according to the present invention, will be described, especially with respect to the cartridge transfer mechanism and cover lock apparatus.

As shown in FIG. 1, a cartridge 4 whcih encloses a disc-like recording medium is inserted from the cartridge insert opening 104 which is opened by opening the cover 105. The cartridge 4 is inserted into the cartridge transfer body or cartridge holder 2 positioned in the loading position by sliding the cartridge along the cartridge insert guide rollers 203 which are arranged on the roller frame 204.

When the cartridge 4 is inserted, the roller 212 of the cartridge urging member 210 is push upwards against the elastic arm 211 so that the cartridge 4 is inserted without rottling. When the cartridge is inserted fully in the cartridge transfer body 2, the roller 212 of the cartridge urging member 210 drops in the positioning recess provided on the upper surface of the cartridge so that the cartridge is locked in position. At the same time, elastic lock member 705 engages with the recess 407 provided on side surface of the cartridge so that positioning and lock of the cartridge in the cartridge transfer body 2 is complete.

When the cartridge is inserted and locked or loaded, the micro-switch 1002 is pushed and actuated to energize the drive motor 301. Thus, the transfer means in the form of the drive mechanism of the link levers is actuated.

When the drive mechanism is actuated, two pairs of the link levers 304 and 305 rotates counterclockwise as shown in FIG. 1 about the shafts 302 and 303. Thus, through the cooperating shaft 208 of the cartridge transfer support frame 205 engaging with the slots 312 and 313 of the link lever 304 and 305 and the guide rollers 207, the cartridge transfer body or cartridge holder 2 moves leftwards as shown in FIG. 2 along the horizontal transfer portion 110 of the transfer guide groove 109 to the intermediate position.

If the link lever were only one pair, the transfer body 2 would tend to incline or rottling. Two pairs of the link levers 304 and 305 distribute the load uniformly and the transfer body moves stably.

Figure 3:
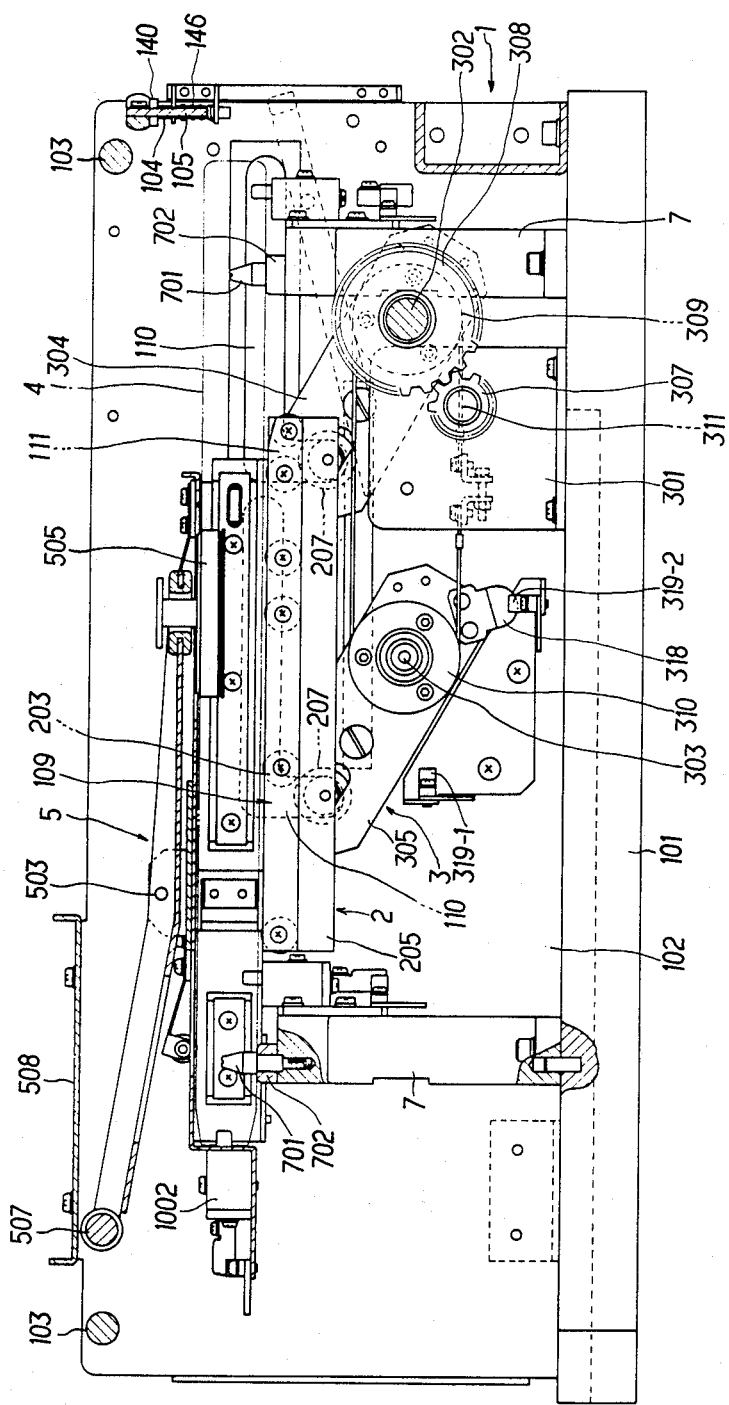

When the transfer guide roller 207 reaches the left or rear end of the guide groove 109, i.e., the vertical descend portion 111, the cartridge transfer body 2 descends toward the driving position along the vertical transfer portion 111 of the guide groove 109 as shown in FIG. 3.

At first, the cartridge positioning holes 403-406 of the cartridge 4 engage-with the positioning pins 701 to determine the horizontal position of the cartridge relative to the turn table 703 and descends further with the cartridge transfer body 2. At the same time, the carrying means in the form of the clamp support arm 504 of the clamp 5 begins clockwise rotation in response to the descending of the cartridge transfer body 2.

As shown in FIG. 3, when the transfer guide roller 207 descends near the lower end of the vertical descent transfer portion 111, the cartridge transfer body 2 descends so that the cartridge 4 guided by the positioning pins 701 reaches the shoulder portion of the vertical positioning member 702 of the pin 701 to define the vertical position of the cartridge relative to the turn table 703. The switch 319-2 is actuated to detect the completion of the descending of the transfer body, and the drive mechanism or transferring means stops operation.

In this position, the disc-like recording medium 9 in the cartridge 4 is supported on the disc support surface of the turn table 703. As shown in FIG. 8, the relative height of the disc support surface of the turn table 703 and the shoulder portion of the vertical positioning member 702 of the positioning pin 701 is determined such that the disc is supported generally in the vertical center portion of the cartridge with sufficient clearance.

The clamp support arm of the disc clamp 5 rotates clockwise as the cartridge transfer body 2 descends, and the clamp head 505 supported by the clamp holder 506 at the free end of the clamp support arm urges the disc 9 from upwards to clamp the disc. The disc 9 is now fit with the spindle guide 704 at the center of the turn table 703. The clamp head 505 has a disc urging member 510 and a magnet 509.

When the cartridge transfer body 2 descends vertically, the guide roller 207 descends along the vertical guide groove 111. When the guide roller 207 descends, the guide roller 207 rocks or acts on the lock actuation lever 142 of the front cover lock apparatus 6. By rocking of the lock actuation lever 142, the lock member 104 moves upwards so that the upper surface of the lock engage portion 139 engages with the lower surface of the lock engage portion 138 of the front cover 105 which is now closed by the spring 154. Thus, rotation of the the front cover 105 is limitted. Urging force of the engage portion 139 is applied by the compression spring 146. Thus, in this state, other cartridge can not be inserted in the apparatus frame, and double insertion of the cartridge is positively prevented.

When the recording or reproducing of the disc or recording medium in the cartridge 4 is completed, eject signal from eject button, not shown, is applied to the drive motor which rotates reversely and the drive mechanism 3 comprising the link levers is actuated to turn clockwise so that the cartridge transfer body 2 moves reversely to the insert or loading process and returns to the unloading position as shown in FIG. 1. In this process, when the cartridge transfer body 2 moves upwards along the vertical guide groove 111, the lock actuation lever 142 rotates clockwise by the force of the spring 151 and returns to horizontal positon when the lever 142 contacts with the stopper pin 148. By rotation of the lock actuation lever 142, the lock member 140 moves downwards to release the lock of the front cover 105 so that the front cover 105 can be opened or closed. The cartridge transfer body moves horizontally guided by the horizontal guide groove 110 to the direction of the front cover. When the transfer guide roller 207 reaches generally right end of the horizontal guide groove 110, the switch element 318 actuates the photo electric switch body 319-1 and after a suitable delay time the drive motor is deenergized. The received cartridge 4 pushes the front cover 105 outward which is now released to be rotatable, and is transferred outward or unloaded from the apparatus.

In the embodiment as shown, the lock member 140 is supported by the support member 141 through the compression spring 146 and the bracket 144. However, as shown in FIG 15, the lock member 140 may be directly secured to a bent portion 141a of the support member 141 by adhesive or screws.

Figure 16:
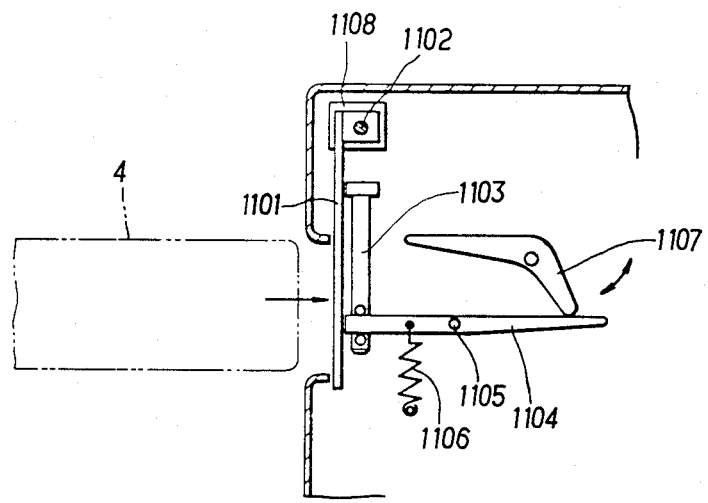
FIGS. 16 and 17 are partial side views illustrating a further embodiment of the lock apparatus in two operational positions.
Figure 17:
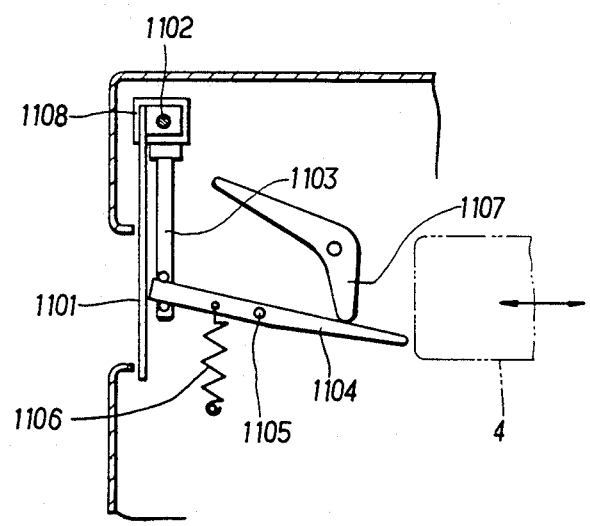

FIGS. 16 and 17 show a further embodiment of the lock apparatus. As shown, a cover 1101 is pivotably supported about a pivot shaft 1102. The cover 1101 is urged to closing direction by spring means, not shown. A lock pin 1103 is connected with a lock actuation lever 1104 to maintain the downward position. The lock actuation lever 1104 is pivotably supported by a support shaft 1105 and is urged downwards by a spring 1106.

When a cartridge 4 is inserted to rotate the cover 1101 counterclockwise, an actuation arm 1107 rotates clockwise cooperating with the cover 1101 and pushes the right arm of the lock actuation lever 1104 downwards as shown in FIG. 17. Consequently, the left end of the lock actuation lever 1104 moves upwards and the lock pin 1103 also moves upwards. The lock pin 1103 engages with lower surface of a lock engage portion 1108 on the rear side of the cover 1101. Thus accidental opening of the cover or double insertion of the cartridge is prohibited.

The pulleys 309 and 310 secured with the link levers 304 and 305 are not necessary to perform simple forward transfer function, and the connecting rod 314 synchronizes the link levers 304 and 305. However, in the drive mechanism driven by link levers, the pulley is necessary when the cartridge transfer body 2 returns to the transcient point or the intermediate position between the horizontal groove 110 and the vertical groove 111 of the guide groove 109. More porticularly, as shown in FIGS. 3 and 8, after the cartridge transfer body 2 ends the transfer of the cartridge 4, positioning of the cartridge, and desired recording or reproducing of the disc, when the cartridge transfer body 2 starts to move upwards along the vertical groove of the guide groove 109, the clockwise rotation of the link levers 304 and 305 applies force to the cooperating shafts 208 which engage with the slots 312 and 313 of the link levers 304 and 305. The applied force consists of vertical vector component and rightward vector component. When the shaft 208 reaches the transcient point between the horizontal and vertical grooves 110 and 111, horizontal component is larger and vertical component to lift the transfer body is small. When the levers 304 and 305 is in the vertical position, the vertical component is zero and all force is horizontal. Thus, to lift the cartridge transfer body smoothly at the transcient point, the applied force to the lever must be sufficiently large. Thus, load to the drive motor is very large.

Conversely, when the inclination angle of the link levers is large, upward component is large enough to lift the cartridge transfer body, however, horizontal component applied is small, so that the motor load is also large.

When the link levers 304 and 305 are connected with each other by the pulleys 309 and 311 and the wire 311, strong rotation force is transmitted to the link levers smoothly and uniformly.

It will be appreciated that the information recording and reproducing apparatus according to the present invention has a simple construction and positive disc clamp is performed by directly securing the clamp mechanism to the disc transfer body and displacing the clamp mechanism directly cooperating with the movement of the disc transfer body.

What is claimed is:

1. An information recording and reproducing apparatus comprising: a transfer body for supporting an information recording medium; a transfer body driver mechanism for driving the transfer body to a turn table; a clamp support arm rockably supported on the transfer body; a clamp head supported on one end of the clamp support arm for clamping the information recording medium on the turn table; and a clamp actuation member disposed on the other end of the clamp support arm and mounted for movement along a guide member which prevents the clamp actuation member from upward movement, the clamp actuation member being actuatable directly by means of downward movement of the transfer body to the turn table by the drive mechanism for rocking the clamp support arm to enable the clamp head to clamp the information recording medium on the turn table.

2. An apparatus as set forth in claim 1; wherein said guide member comprises a guide plate engaging with the upper end of the clamp actuation member.

3. An apparatus as set forth in claim 1; wherein said guide member comprises means defining an elongated opening.

4. An apparatus as set forth in claim 1; wherein said information recording medium is contained in a cartridge.

5. In an information recording and reproducing apparatus for use with a record medium: holding means for removably holding a record medium; transferring means for effecting a horizontal transfer movement of the holding means from a loading position at which the record medium is loaded in the holding means to an intermediate position and for effecting a vertical transfer movement of the holding means from the intermediate position to a driving position at which the loaded medium can be driven; clamping means operative when moved to a working position for clamping the loaded record medium; and carrying means movably mounted on the holding means and carrying thereon the clamping means for positioning the same relative to the holding means, the carrying means being actuated directly by the holding means during the vertical transfer movement thereof to place the clamping means in the working position when the vertical transfer movement is completed.

6. An apparatus as set forth in claim 5; wherein the carrying means comprises an arm pivotably movable relative to the holding means, the arm carrying the clamping means at a free end thereof.

7. An apparatus as set forth in claim 6; wherein the holding means includes means for acting on the arm during the vertical transfer movement to effect the pivotal movement of the arm.

8. An apparatus as set forth in claim 7; wherein the means for acting comprises a pivot shaft secured on the holding means for pivotably supporting the arm.

9. An apparatus as set forth in claim 7; including guiding means for guiding the arm during the vertical transfer movement to thereby determine the working position of the clamping means.

10. An apparatus as set forth in claim 9; wherein the guiding means further guides the arm during the horizontal transfer movement to restrict the pivotal movement of the arm.

11. An apparatus as set forth in claim 6; wherein the arm comprises a bent arm pivotably supported at the bent portion thereof and having means at one end thereof for supporting the clamping means and means at the other end thereof for controlling the extent of pivotal movement of the bent arm.

12. An apparatus as set forth in claim 5; wherein the transferring means includes a drive motor for producing a rotational torque, and converting means for converting the rotational torque to the horizontal and vertical transfer movements.

13. An apparatus as set forth in claim 12; wherein the converting means comprises a link lever rotationally driven by the drive motor, a guide roller secured to the holding means and slidably engaging with the link lever, and means defining a guide groove having a horizontal portion and a vertical portion contiguous with the horizontal portion for slidably receiving therein the guide roller to guide the guide roller.

14. An apparatus as set forth in claim 5; wherein the holding means comprises a cartridge holder for removably receiving therein a disc cartridge accommodating therein a record medium disc.

* * * * *